(12) United States Patent
Haq et al.

(10) Patent No.: US 7,812,327 B2
(45) Date of Patent: Oct. 12, 2010

(54) HIGH-EMISSIVITY RADIATOR

(75) Inventors: Sajad Haq, Mansewood (GB); Michael Christopher Hebbron, Hen Leaze (GB); José Virgilio Anguita Rodriguez, Hook (GB); Sembukuttiarachilage Ravi Pradip Silva, Camberley (GB)

(73) Assignee: BAE Systems PLC, London (GB)

( * ) Notice: Subject to any disclaimer, the term of this patent is extended or adjusted under 35 U.S.C. 154(b) by 76 days.

(21) Appl. No.: 10/593,096

(22) PCT Filed: Sep. 30, 2005

(86) PCT No.: PCT/GB2005/050171

§ 371 (c)(1),
(2), (4) Date: Sep. 15, 2006

(87) PCT Pub. No.: WO2006/038040

PCT Pub. Date: Apr. 13, 2006

(65) Prior Publication Data

US 2007/0210265 A1 Sep. 13, 2007

(30) Foreign Application Priority Data

Oct. 1, 2004 (EP) .................................. 04256077
Oct. 1, 2004 (GB) .................................. 0421809.5

(51) Int. Cl.
*F28F 13/18* (2006.01)

(52) U.S. Cl. ................................ 250/493.1; 250/504 R; 428/216; 428/336; 428/408; 428/426; 428/651

(58) Field of Classification Search .............. 250/493.1, 250/504 R; 428/216, 336, 408, 426, 651
See application file for complete search history.

(56) References Cited

U.S. PATENT DOCUMENTS 5,135,808 A * 8/1992 Kimock et al. .............. 428/336

(Continued)

FOREIGN PATENT DOCUMENTS

EP 0 440 384 A1 8/1991

(Continued)

OTHER PUBLICATIONS

PCT/IB/326 for PCT/GB2005/050171 received May 9, 2007.

(Continued)

*Primary Examiner*—David A Vanore
*Assistant Examiner*—Michael Maskell
(74) *Attorney, Agent, or Firm*—Buchanan Ingersoll & Rooney PC

(57) ABSTRACT

This invention relates to a radiator 10 and to a method of making a radiator. In particular, this invention relates to a radiator 10 having thin-film 5 coatings that serve to increase the thermal emissivity of the entire structure. A radiator 10 is provided comprising a substrate 12, an amorphous carbon layer 16 and the metallic carbide forming layer 14 interposed between the substrate 12 and amorphous carbon layer 16. In addition, a method of making a radiator is provided comprising the steps of forming the metallic carbide-forming layer on a substrate and forming an amorphous carbon layer on the metallic carbide-forming layer.

20 Claims, 2 Drawing Sheets

U.S. PATENT DOCUMENTS

| | | |
|---|---|---|
| 5,206,083 A | 4/1993 | Raj et al. |
| 5,313,325 A | 5/1994 | Lauf et al. |
| 5,619,060 A | 4/1997 | Pritchard et al. |
| 6,080,445 A * | 6/2000 | Sugiyama et al. ........ 427/249.7 |
| 6,284,376 B1 * | 9/2001 | Takenouchi et al. ......... 428/408 |
| 6,942,022 B2 | 9/2005 | Blangetti et al. |
| 2001/0024737 A1 * | 9/2001 | Utsumi et al. ............... 428/651 |
| 2004/0069466 A1 * | 4/2004 | Blangetti et al. ............ 165/133 |

FOREIGN PATENT DOCUMENTS

| | | |
|---|---|---|
| EP | 0440384 A1 * | 8/1991 |
| EP | 0 828 015 A2 | 3/1998 |
| EP | 0 828 015 A3 | 3/1998 |
| EP | 0 859 536 A1 | 8/1998 |
| WO | WO 02/40934 | 3/2002 |

OTHER PUBLICATIONS

PCT/IB/373 for PCT/GB2005/050171 dated Jan. 2004.
PCT/ISA/237 for PCT/GB2005/050171 received Feb. 2, 2006.
European Examination Report dated Apr. 18, 2008.

* cited by examiner

HIGH-EMISSIVITY RADIATOR

This invention relates to a radiator and to a method of making a radiator. In particular, this invention relates to a radiator having thin-film coatings that serve to increase the emissivity of the entire structure thereby better to match the thermal radiation of a "black-body" radiator. The invention also relates to how such a radiator is made.

All bodies will generally emit thermal radiation, and the efficiency at which they emit thermal radiation is defined as that body's emissivity. The emissivity is quantified as a percentage of the thermal radiation from an ideal source, commonly referred to as a black body. Although it is theoretically impossible to realise the perfect black body, current optimised optical designs in combination with careful selection of materials have seen radiators with emissivity values as high as 95% over their intended operating wavelength range. As is well known, emissivity will vary over the electromagnetic spectrum and so is optimised for a particular operational wavelength range.

Radiators with high emissivity are useful in a number of industrial and research applications. For example, they may be used as calibration standards for pyrometers or may be used in a thermal picture synthesiser to form infra-red images for the testing of infra-red imaging or targeting equipment.

Current designs are often based on optical stacks and are multilayers. This multilayer approach needs highly accurate thickness control of each layer otherwise the performance of the entire structure is compromised. Single layer emitters are relatively thick and have inferior mechanical properties. These high-emissivity radiators have been bulky. The increased mass results in a slower response time to reach their operating temperature and hence to produce the desired thermal radiation spectrum. This is a particular problem in thermal picture synthesising where imaging must be performed at typical television frame rates (e.g. 50 Hz). In addition, the bulk of the high-emissivity radiators means that they cannot be applied to an object without the size and, possibly, shape of that object changing significantly.

Against this background, and from a first aspect, the present invention resides in a radiator comprising a substrate, an amorphous carbon layer and a metallic carbide-forming layer interposed between the substrate and amorphous carbon layer. This arrangement allows thin-films of the metal and amorphous carbon to be deposited that have very little bulk and hence mass. In addition, the thin films will conform to the shape of an object to be treated without substantially altering the size or shape of that object. Moreover, provision of the metallic and amorphous carbon layers produces a radiator that can match the 95% emissivity of known designs.

Preferably, the amorphous carbon layer has a thickness in the range 0.1 to 1.0 micromets, a thickness in the range 0.3 to 0.6 micrometers being particularly preferred and a value of substantially 0.4 micrometers being preferred still further. These values have been found to produce high emissivity in the infra red region.

The carbide-forming layer may be integral with the substrate or it may be separate from the substrate. For example, if the substrate itself is capable of forming a carbide layer when amorphous carbon is deposited thereon, there is no need to deposit a separate metallic carbide-forming layer. On the other hand, the substrate may not form a carbide or may form a carbide only poorly, in which case it is either necessary to deposit a metallic carbide-forming layer or better results may be obtained by depositing a separate metallic carbide-forming layer. For example, the metallic carbide-forming layer may comprise titanium. This arrangement leads to a titanium layer adjacent an amorphous carbon layer, the reaction between these layers forming titanium carbide at their interface. The titanium may be the substrate material or may, for example, be a layer deposited onto a semiconductor substrate. Optionally, the titanium layer has a thickness in the range of 0.1 micrometers to 1.0 micrometers, a thickness of substantially 0.3 micrometers being particularly preferred.

Optionally, the amorphous carbon layer and/or the metallic carbide forming layer is formed by sputter deposition.

The amorphous carbon layer may, optionally, be protected by a protective layer. This may then afford protection from damage by abrasives and/or oxidation. To avoid attenuation of infra-red thermal radiation emitted by the radiator, the protective layer should be substantially transparent to infra-red radiation. For example, the protective layer may optionally comprise SiC, $SiO_2$, diamond or diamond-like carbons.

From a second aspect, the present invention resides in a method of making a radiator comprising the steps of forming a metallic carbide-forming layer on a substrate and forming an amorphous carbon layer on the metallic carbide-forming layer. The metallic carbide-forming layer and the amorphous carbon layer may be formed in any order. For example, the metallic carbide-forming layer may be deposited onto a substrate and the amorphous carbon layer subsequently deposited onto the metallic carbide-forming layer. Alternatively, the amorphous carbon layer may be deposited directly onto a substrate if the substrate is capable of forming a metallic carbide itself: in this way, deposition of the amorphous carbon may cause a reaction with the substrate thereby forming a carbide layer automatically. Such a radiator will have the advantages discussed above in relation to the first aspect of the present invention.

Preferably, the amorphous carbon layer is formed to a depth in the range 0.1 micrometers to 1.0 micrometers, a thickness in the range 0.3 micrometers to 0.6 micrometers being particularly preferred and a value of substantially 0.4 micrometers being preferred still further. Optionally, the amorphous carbon layer is formed by sputter deposition. Preferably, the sputter deposition is performed from a substantially pure graphite target that may optionally be performed at a pressure of $1 \times 10^{-6}$ Torr or less. Preferably, the sputtering is performed using an inert gas such as argon. These measures help to maintain the purity of the amorphous carbon. Emissivity has been found to decrease as the level of impurities in the amorphous carbon film increases.

Optionally, a titanium layer is formed as the metallic carbide layer and the titanium layer may optionally be formed by sputter deposition or evaporation. Preferably, the titanium layer is formed to a thickness in the range of 0.1 micrometers to 1.0 micrometers, a thickness of substantially 0.3 micrometers being particularly preferred.

The method may optionally further comprise the step of forming a protective layer on top of the amorphous carbon layer. Preferably, a layer of SiC, $SiO_2$, diamond or diamond-like carbon is formed as the protective layer.

Optionally, the radiator is annealed after the steps of forming the metallic carbide-forming layer and the amorphous carbon layer. Preferably, the radiator is annealed at a temperature in the range 600° C. to 900° C., at a temperature of substantially 800° C. being particularly preferred. In a currently preferred embodiment, the radiator is annealed by holding the radiator at a temperature of substantially 800° C. for substantially five minutes and may, optionally, be annealed in an inert atmosphere (in argon, for example).

The invention will now be described, by way of example only, by reference to the accompanying drawings in which.

Figure 1:
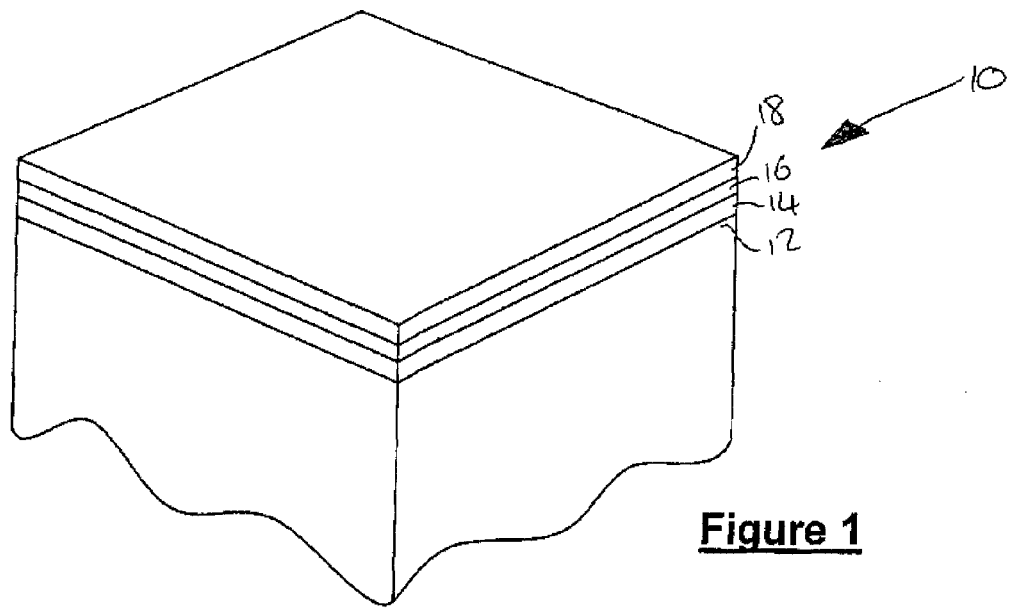
FIG. 1 is a perspective view of a radiator according to an embodiment of the present invention.

A radiator 10 according to an embodiment of the present invention is shown in FIG. 1 and comprises a silicon substrate 12 that provides a substrate surface 12a on which is deposited a titanium film 14, an amorphous carbon film 16 and a protective silicon carbide (SiC) film 18, each film capping the previous one. The titanium, amorphous carbon and SiC films 14, 16, 18 are thin, each being less than a micrometer thick, whereas the thickness of the substrate 12 is much greater in this instance (of the order of millimeters). However, the substrate may be thinner, even as thin as the titanium, amorphous carbon and SiC films 14, 16, 18. As will be clear, the thicknesses of the titanium, amorphous carbon and SiC films 14, 16, 18 relative to the size of the substrate 12 in FIG. 1 have been increased for the sake of clarity. This radiator 10 exhibits high thermal emissivity in the infra red range.

Figure 2:
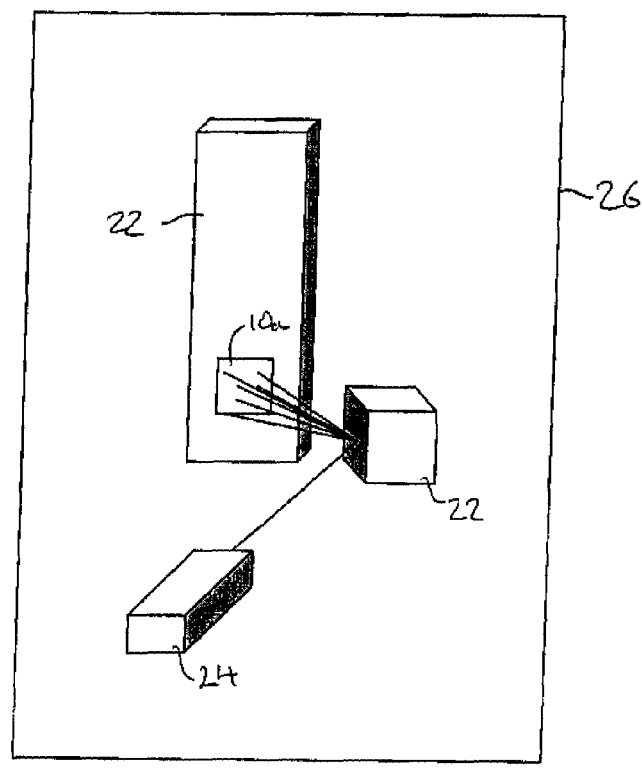
FIG. 2 is a simplified representation of apparatus for making a radiator according to a preferred method of the present invention.

FIG. 2 shows, as a simplified sketch, apparatus suitable for growing the titanium, amorphous carbon and SiC films 14, 16, 18 on the substrate 12. The substrate 12 is prepared to produce the substrate surface 12a that is both clean and smooth. The substrate 10 is mounted on a substrate table shown schematically at 20 such that the surface 18 faces a sputtering target 22 and ion source 24. The substrate table 20, sputtering target 22 and ion source 24 are located within a vacuum chamber shown generally at 26.

In order to make the high-emissivity radiator 10, the prepared substrate 12 is held in the vacuum chamber 26 at $1 \times 10^{-6}$ Torr and the films 14, 16, 18 are deposited onto the substrate surface 12a at this reduced pressure. All three films 14, 16, 18 are deposited using the well-known technique of sputter deposition. In this embodiment, the ion source 24 is aimed at one of three interchangeable sputtering targets 22, the targets 22 being made of titanium, pure graphite and SiC. The ion source 24 may be of any standard construction, e.g. a diode or magnetron where both electrodes are preferably water-cooled (not shown). High-purity argon gas is used as the source of ions and is introduced at a flow rate to increase the pressure within the vacuum chamber to 4 milliTorr. The substrate table 20 may be earthed or it may be electrically floating.

Initially, the titanium sputter target is placed in the position indicated at 22 and the ion source 24 activated such that a thin film of titanium 12 is deposited onto the clean substrate surface 12a to a depth of 0.3 micometers. The depth may be ascertained in any number of standard ways such as using a quartz micro-balance (not shown). The titanium sputtering target is then replaced by the graphite sputtering target at position 22. Activating the ion source 24 results in an amorphous carbon film 16 being deposited onto the titanium film 14. This second phase of sputtering continues until an amorphous carbon film 16 with a thickness of 0.5 micrometers is deposited. An amorphous carbon film 16 results that is soft and can easily be scratched with a pair of tweezers or the like: this type of film 16 has been found to produce optimal emissivity.

The radiator 10, now comprising substrate 12, titanium film 14 and amorphous carbon film 16, is then annealed at the vacuum chamber's base pressure of $1 \times 10^{-6}$ Torr, most of the residual gas within the vacuum chamber 26 comprising the inert argon that was introduced for sputtering. This is beneficial as the argon will not react with the amorphous carbon film 16 during the annealing process. The radiator 10 is heated such that its temperature slowly increases to 800° C. The radiator 10 is then held at 800° C. for five minutes before being allowed to cool slowly to the ambient temperature. This annealing step produces an amorphous carbon film 16 with improved homogeneity and this in turn provides a higher thermal emissivity that is uniform across the radiator 10.

Finally, the graphite target 22 is replaced with the SiC target such that the protective SiC film 18 can be formed on the amorphous carbon film 16 by sputter deposition. The SiC film 18 is deposited to a thickness of between a micrometer or less up to over a millimeter thick, a thickness of 0.1 micrometer being currently preferred. Such a SiC film 18 is transparent to infra red radiation.

Figure 3:
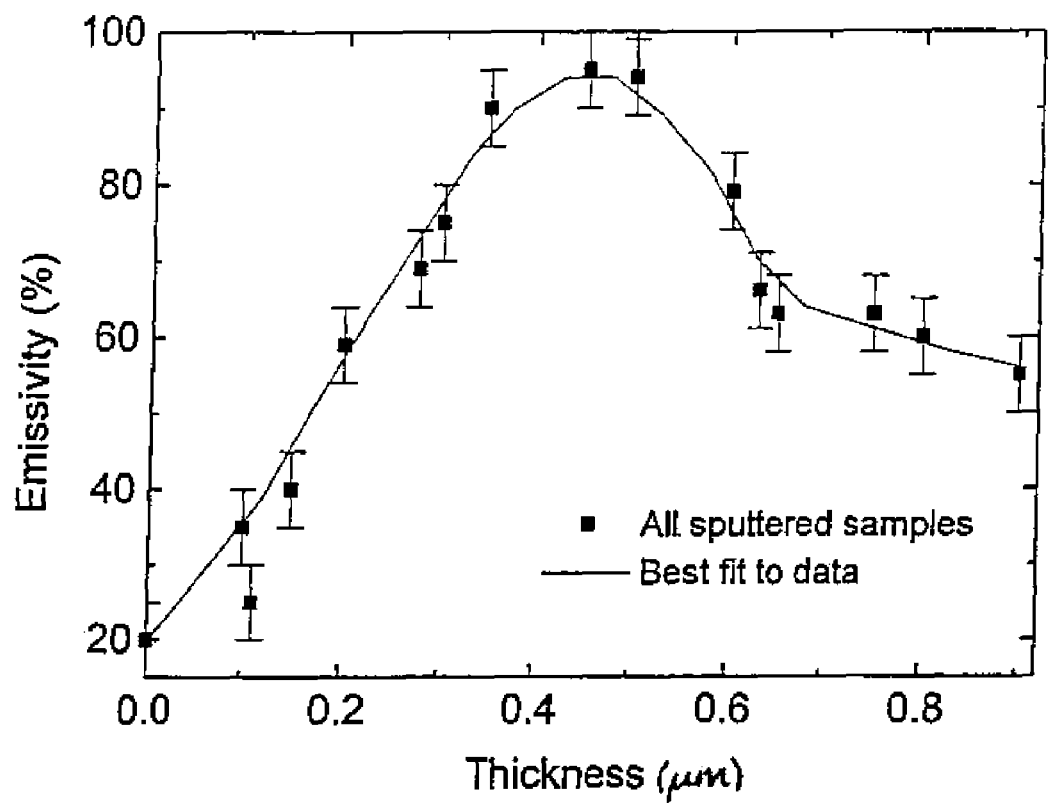
FIG. 3 is a graph showing emissivities achieved for a number of radiators according to an embodiment of the present invention as a function of the thickness of the amorphous carbon film.

In this way, a radiator 10 is formed that has high emissivity at wavelengths between 3 and 5 micrometers (in the infra red range). Emissivities as high as 95% have been measured. We have found that the emissivity varies as a function of thickness of the amorphous carbon film 16 as is shown in FIG. 3.

It will be readily apparent to those skilled in the art that variations to the above described embodiment are possible without departing from the scope of the invention defined in the appended claims.

For example, the films 14, 16, 18 need not entirely cover the substrate 12. The films may cover one or more areas of the substrate surface 12a and may even be formed according to a desired pattern. Where sputtering is used as the method of deposition, masks can be used to achieve the desired pattern. Moreover, the films 14, 16, 18 need not extend to cover the same areas. It is highly advantageous for the titanium and amorphous carbon films 14, 16 to be coterminous, but a protective film 18 may only be needed in selective areas that are particularly prone to damage.

Silicon is but one example of a substrate. Essentially, any material may form the substrate if it will allow deposition of titanium and will withstand the annealing process. Suitable substrates include semiconductors and metals.

Whilst the above embodiment employs interchangeable sputtering targets 22, the sputtering targets 22 may be located in fixed but different positions. Such sputtering targets 22 may share a common ion source 24 that may be directed to each sputtering target 22 or there may be a dedicated ion source 22 for each sputtering target 22. In addition, argon is but a preferred source of ions. Alternatives, such as nitrogen or oxygen, are also possible.

Ion source sputtering is one of many well-known techniques suitable for forming the films 14, 16, 18 on the substrate 12. For example, plasma-source sputtering, chemical vapour deposition, laser ablation, cathodic arc processes or evaporation such as molecular beam epitaxy (MBE) using e.g. thermal or e-beam heat sources may be used to form the films 14, 16, 18.

Whilst the radiator 10 has been annealed prior to deposition of the protective SiC film 18, the annealing could equally well be performed after deposition of the SiC film 18.

The invention claimed is:

1. A high emissivity radiator comprising a substrate, an amorphous carbon layer formed on a radiating surface of the substrate, and a metallic carbide layer interposed between the substrate and the amorphous carbon layer and a protective layer formed on the amorphous carbon layer, wherein the amorphous carbon layer is soft and susceptible to scratches wherein the metallic carbide layer has a thickness in the range of 0.1 micrometers to 1.0 micrometers.

2. The radiator of claim 1, wherein the metallic carbide-forming carbide layer comprises titanium.

3. The radiator of claim 1, wherein the amorphous carbon layer has a thickness in the range of 0.1 micrometers to 1.0 micrometers.

4. The radiator of claim 1, wherein the protective layer is substantially transparent to infrared radiation.

5. The radiator of claim 4, wherein the protective layer comprises at least one of SiC, $SiO_2$, diamond and diamond-like carbon.

6. A method of making a radiator having an emissivity of at least 30% for radiation of wavelength in the range of 3 μm to 5 μm, the method comprising the steps of:
   providing a substrate having a radiating surface;
   forming a metallic carbide-forming layer on the radiating surface;
   forming an amorphous carbon layer on and in contact with the metallic carbide-forming layer, wherein the amorphous carbon layer is soft and susceptible to scratches; and
   forming a protective layer on the amorphous carbon layer, wherein each of the metallic carbide layer, the amorphous carbon layer, and the protective layer has a thickness of less than 1 micrometer and greater than 0.1 micrometers.

7. The method of claim 6, wherein the amorphous carbon layer and/or the metallic carbide forming layer is formed by sputter deposition or evaporation.

8. The method of claim 1, wherein the radiator is annealed after the steps of forming the metallic carbide-forming and amorphous carbon layers.

9. A radiator comprising:
   a substrate;
   a soft amorphous carbon layer formed on the substrate, wherein the soft amorphous carbon layer is susceptible to scratches; and
   a metallic carbide layer interposed between the substrate and the amorphous carbon layer, wherein the metallic carbide layer is in contact with the amorphous carbon layer wherein the metallic carbide layer has a thickness in the range of 0.1 micrometers to 1.0 micrometers.

10. The radiator of claim 9, being a high emissivity radiator.

11. The radiator of claim 9 wherein the amorphous carbon layer is an annealed amorphous carbon layer.

12. A method of making a radiator comprising the steps of:
    providing a metallic carbide-forming layer on a substrate; and
    forming a soft amorphous carbon layer on and in contact with the metallic carbide-forming, layer, wherein the soft amorphous carbon layer is susceptible to scratches wherein the metallic carbide-forming layer has a thickness in the range of 0.1 micrometers to 1.0 micrometers.

13. The method of claim 12 wherein the radiator is a high-emissivity radiator.

14. The method of claim 12 wherein the metallic carbide-forming layer is provided as an integral surface layer of the substrate.

15. The method of claim 12 wherein the metallic carbide-forming layer is provided as a separate layer on a surface of the substrate.

16. The radiator of claim 2, wherein the amorphous carbon layer has a thickness in the range of 0.1 micrometers to 1.0 micrometers.

17. The radiator of claim 9, wherein the carbide layer comprises titanium.

18. The method of claim 6, wherein the radiator is annealed after the steps of forming the amorphous carbon layer.

19. The method of claim 12, wherein the radiator is annealed after the steps of forming the amorphous carbon layer.

20. The radiator of claim 1, wherein each of the metallic carbide layer, the amorphous carbon layer, and the protective layer has a thickness of less than 1 micrometer, and
    wherein the radiator has an emissivity of at least 30% for radiation of wavelength in the range of 3 μm to 5 μm.

* * * * *